May 4, 1926.

J. H. MACALPINE 1,583,407

POWER TRANSMITTING DEVICE

Filed August 5, 1921

INVENTOR
John H. Macalpine

Patented May 4, 1926.

1,583,407

UNITED STATES PATENT OFFICE.

JOHN H. MACALPINE, OF PITTSBURGH, PENNSYLVANIA.

POWER-TRANSMITTING DEVICE.

Application filed August 5, 1921. Serial No. 490,020.

*To all whom it may concern:*

Be it known that I, JOHN H. MACALPINE, a citizen of the United States, residing at Pittsburgh, in the county of Allegheny and State of Pennsylvania, have invented a new and useful Improvement in Power-Transmitting Devices, of which the following is a full, clear, and exact description.

My invention relates to power transmission devices and is concerned particularly with the prevention of vibration and occurrence of undue stresses in such devices.

An object of my invention is a power transmitting device wherein there is a plurality of units rigidly connected together and in which the units are so proportioned and arranged that undue torsional stresses and vibrations will be effectively prevented throughout the whole range of speed change.

Figure 1:
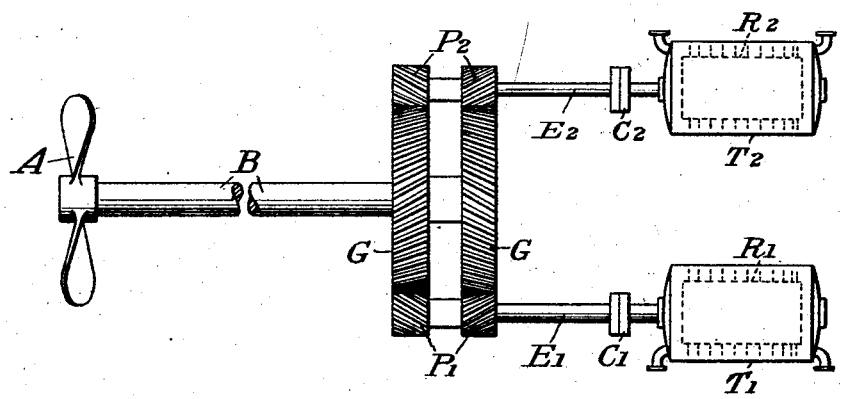
Figure 2:
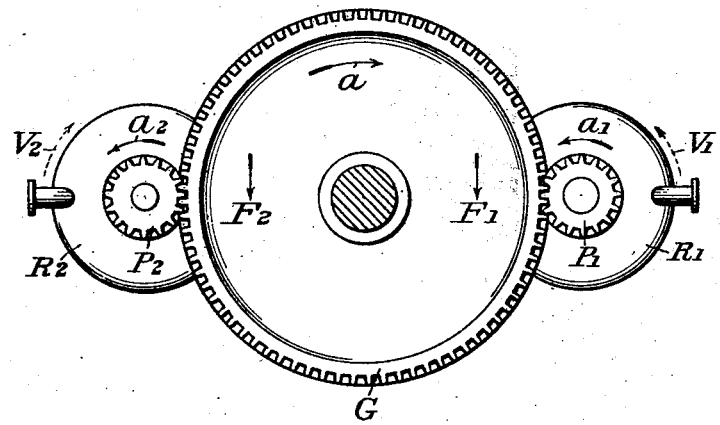

Further objects will be apparent upon the reading of the following specification, taken in combination with the following drawings, in which Figure 1 is a diagrammatic plan view showing the preferred embodiment of the invention, and Figure 2 is an elevation of the gearing.

If an elastic system is vibrating, it is due to some exciting cause which has been or is being applied.

In an elastic system consisting of a toothed gear transmitting power from a turbine, electric motor, or other source of power, and transmitting it to a propeller, pump, fan, or other apparatus, there are three principal sources of excitation of torsional vibration of the shafting:—

(1) The variable torque applied by the motor. This is very variable in a reciprocating engine; usually much less pronounced in the case of an electric motor; negligible in the case of a turbine.

(2) The variable torque due to the variable resistance of the propeller load, or other driven apparatus.

This variation is very considerable in the case of a ship's propeller even in a calm sea; and if the propeller is correctly made, one cycle of the torque variation will occur as many times in a revolution as there are blades in the propeller; that is, if the propeller is running at 100 R. P. M., and has four blades, there will be 400 cycles per minute. As the variation will be more or less of the nature of a shock, it may be analyzed into simple harmonic variations of 400, 800, 1200, etc., etc., each of which will tend to set up torsional vibrations of its own period, viz., 400, 800, 1200, etc., etc., per minute, respectively. If the propeller is badly made, or broken, the 100 and 200 per minute periods may appear. If the sea is rough the variable impulses from the propeller will be irregular and, consequently, over a sufficient time to give rise to torsional vibrations, analysis may show impulses of almost any period.

In the case of a reciprocating pump and some forms of blower, or compressor, the variation of resistance is also large. This may similarly be analyzed into a series of simple harmonic variations, each of which will give rise to torsional vibrations of its own period.

A rotary fan or centrifugal pump will usually give a nearly constant resistance.

(3) The variation of the pitch of the teeth, especially in the large gear, but possibly sometimes in the pinions, will, under conditions of exact or approximate synchronism, give rise to torsional vibrations causing a considerable rise of stress in the shafting.

This variation of pitch in well cut gears is very small, never involving the displacement of any tooth from its correct position of more than a very few thousandths of an inch even in a gear of large diameter.

The errors will usually be distributed very irregularly and can be analyzed into simple harmonic elements. That of longest period will pass through one complete cycle in one circumference of the large gear or pinion. The second will complete two cycles in one circumference; the third three cycles, and so on. Measurement and analysis of these errors has shown that several periods were prominently present. Each will give rise to a torsional vibration of its own period. That is, if the elastic state of the gear is such that it very readily responds torsionally to 300 impulses per minute, the first-period errors of the large gear will most readily set up torsional vibrations when it is revolving at 300 R. P. M.; the second-period error of the teeth of this gear will most readily set up torsional vibrations of 300 per minute when it is revolving at 150 R. P. M.; the third-period error when revolving at 100 R. P. M., and so on.

Similarly, where a pinion is revolving at 300 R. P. M., its first-period (second-period, third-period, and so on) error will tend to set up torsional vibrations at 300 per minute; but if the ratio of reduction is, say, 5 to 1, this will happen at 60 R. P. M., (30 R. P. M., 20, etc.) of the main gear. This would usually be at a low power. Besides, the linear errors of pitch of the pinion teeth which are due to errors of rotation of the table of the gear cutting machine would, in this case, be only one-fifth of those of the main gear if cut on the same machine. Hence the effect will be small in most cases. While not forgetting these pinion errors, they need not be again referred to.

It is not necessary to enter into the question of what actions limit the growth of torsional vibrations, or vibrations generally.

The fact of the first-period errors of the teeth may be first considered for convenience in connection with reduction gearing for marine turbines.

In a ship's gear the propeller is driven through a comparatively stiff, but still elastic, steel shaft. Each pinion is driven, as supposed, through a smaller and much more elastic shaft. Supposing, there were no frictional or other resistance, and that after straining the whole system torsionally it is suddenly released, torsional vibrations would be set up and continue indefinitely. If this could be plotted, it would be found to be a compound harmonic vibration. If there were only one pinion, the whole vibration would be found to be made up, neglecting very slight effects, of two distinct vibrations of different periods. If there were two pinions there would be three periods; (unless the pinions, their elastic shafts, and motors were identical, or so related as to be elastically equivalent, when there would be two periods only; and then, at least in some cases, the response to impulses of that period would be especially sensitive, as explained in the sequel); with three pinions there would be four periods (with a similar proviso), and so on.

There is one other condition for vibration, one which would rarely appear when the whole system is vibrating freely, as supposed above, but which is the one most important, in connection with the present proposals to prevent serious vibrations being set up.

The source and the effect of the vibrations can conveniently be discussed in connection with the drawings in which is illustrated the preferred embodiment of the invention showing one way to counteract the vibrations. In the drawings, the invention is illustrated as applied to turbine drive for a ship. The propeller A is driven by a shaft B connected with a large driving gear G. The gear G is driven by two similar driving units, each comprising a similar source of power illustrated as the steam turbines $T_1$ and $T_2$ having rotors $R_1$ and $R_2$, shafts $E_1$ and $E_2$ and pinions $P_1$ and $P_2$ meshing with the gear G. The gear G and the pinions $P_1$ and $P_2$ are illustrated as divided helical gears and pinions, a construction commonly employed in ship propulsion. The shafts $E_1$ and $E_2$ are preferably provided with the usual flexible couplings $C_1$ and $C_2$, respectively.

As illustrated, the shaft $E_1$ is made of a greater diameter and consequently has greater torsional rigidity than the shaft $E_2$, whereby its driving unit has a higher natural period of torsional vibration than the driving unit having the smaller shaft.

The invention relates particularly to giving the driving units dissimilar natural periods of vibration, whereby undue torsional stresses and vibrations are prevented.

The source of the torsional vibrations will be apparent from the following considerations. Suppose that one of the pinions, say $P_1$, be held rigidly and an axial torque be applied to the rotor $R_1$ and suddenly released. $R_1$ will then vibrate torsionally with a definite period. If now a simple harmonic torsional vibration of the same period be applied to the pinion $P_1$, it will set up the same period of vibration in the rotor $R_1$, but with an angular amplitude greater than that imparted to $P_1$. If the shaft $E_1$ is as elastic as should be fitted in such a gear, the amplification of the amplitude of vibration of $R_1$ over that of $P_1$ will be very large (in some cases one hundred times or more) and, consequently, the stress in the shaft $E_1$ may rise to a dangerously high value even for a small disturbance of $P_1$.

For instance, suppose the rate of vibration of $R_1$, when $P_1$ is fixed, is 400 per minute and there is a first period error of 1/20,000 radian amplitude in the cutting of the teeth of the large gear G. If the large gear were rotating uniformly and there were a reduction of, say, 5 to 1, the amplitude of disturbance of $P_1$ from the tooth error in the large gear would be 5/20,000 or 1/4000 radian. If now the amplification of the response of $R_1$ over that of $P_1$ is 100 to 1, we would have a resulting vibration of $R_1$ with an amplitude of 1/40 radian, or nearly 1.5 degrees on each side of the mean, at the rate of 400 per minute. This would be a very serious vibration, giving rise to very strong forces in shaft $E_1$ and between the teeth of the gear and pinion.

But with only one pinion actuating the gear, such forces would set up a corresponding vibration of the large gear so timed as to diminish the effect of the first period error of the teeth. Indeed this vibration of the large gear would usually be sufficient to practically counteract the tooth error and make the resulting vibration of the rotor of the turbine so small as to be negligible, and the gear would run quite smoothly.

The case is very different when there are two or more pinions, if these and their elastic shafts and turbine rotors are substantially identical or elastically equivalent.

For facility of explanation, I refer to the drawings, supposing for this purpose that the shafts $E_1$ and $E_2$ are of the same diameter and elastically equivalent. Since the rotors $R_1$ and $R_2$ have the same moments of inertia, the two driving units will have the same natural periods of vibration. I will suppose that the gear G is running considerably slower than will produce, through the first period tooth error, a vibration of synchronous speed in $P_1$ and $P_2$, their rotors, and elastic shafts. Then each pinion and its rotor will reach their maximum vibrational displacement in the same direction—say their maximum left handed displacement (Figure 2)—at very nearly the same instant. The directions of non-vibratory rotation are shown by the arrows $\omega$, $a_1$, $a_2$. Suppose the configuration to be such that the tooth error of the gear G has caused $P_1$ to be at that end of its vibration indicated by the dotted arrow $V_1$ the maximum left-handed; that is, in advance, by the whole amplitude, of the position it would have been in had there been no tooth error, since $a_1$ and $V_1$ are both pointing left-handed. Now, in half a circumference of G, the first period tooth error is half of the cycle different. Consequently, $P_2$ is behind its proper position by the full amplitude of its vibration, as indicated by the dotted arrow $V_2$. Hence, the vibrational tooth pressure of both $P_1$ and $P_2$ exert, at the instant supposed, a maximum downward pressure on the teeth of G, as indicated by $F_1$ and $F_2$. $F_1$ tends to accelerate G and $F_2$ to retard it by the same amount, if the pinions are of the same diameter, since the design is then quite symmetrical. These forces have a simple harmonic variation with the same period as the pinion vibration, and in half a cycle they will be directed upward; at all times they are equal and similarly directed. G would therefore rotate uniformly.

If G is running considerably faster than the synchronizing speed for the vibration we are considering, when either pinion is at maximum left-handed (right-handed) displacement, its rotor, at practically the same instant, is at maximum right-handed (left-handed) displacement. As the rotor has always much greater moment of inertia about its axis of rotation than the pinion, the direction of the forces, $F_1$, $F_2$, would be reversed from that shown in Figure 2. Otherwise the case is unchanged and G would rotate uniformly.

At synchronizing speed the vibration of the rotor would lag one-quarter period behind that of its pinion, which would still leave the forces, $F_1$, $F_2$, equal and similarly directed at all times, and G would rotate uniformly.

The same can be shown to be true in any case intermediate to those stated above, but it would be tedious to follow the action.

Hence at all speeds the first-period error of the teeth would (unlike the result in the case of the single pinion, considered above) produce its full effect in vibrating the pinions; and near synchronizing speed the great amplification of amplitude of the induced vibration of the rotor over that of the pinion would produce severe stresses in the elastic shafts, unless the tooth errors were less than there is any reason to hope for.

If $P_1$ and $P_2$ are of different pitch diameters, the action would be modified, as G would now participate in the vibration; but the resulting stresses in the elastic shafts would not be greatly reduced, in any practical case, from the foregoing case where $P_1$ and $P_2$ are of the same pitch diameter.

If $P_1$ and $P_2$ were less than 180 degrees apart, G would participate in the vibration and thus modify, by different amounts the vibration of $P_1$ and $P_2$, increasing one and diminishing the other, but causing severe vibration until the center lines $OP_1$, $OP_2$ stood at a small angle—a case practically impossible, or most unlikely to occur—when they would act very nearly together and approximate to the case of a single pinion already noted.

In the case of a gear driven by a compound turbine, H. P. and L. P., the units comprising the pinions with their elastic shafts and rotors are not usually elastically equivalent; the heavier and larger L. P. rotor making its free torsional vibration (the pinion being fixed) slower than for the H. P. The action is such as to greatly mitigate the resulting vibrations at both the synchronizing speed for the H. P. and L. P. elements or units. But this condition would not occur unless specially so designed if the motors were two reciprocating engines, two electric motors, or two water turbines or, possibly, some other drive.

If G were driven by two or more units, substantially identical, elastically, a dangerous combination would occur. This could be avoided by properly arranging the elastic values of the driving units. For instance, suppose there were four pinions, two driven by high pressure steam turbines, and two by low pressure turbines, arranged in any way round the gear axis. The twin high pressure units would naturally be made from the same design and commercially identical; and similarly, the twin low pressure units would be made commercially identical.

Such a combination would give rise to severe torsional vibration at the synchronizing speeds of the high pressure and also at that of the low pressure units.

By my invention the severe and dangerous torsional strains and vibrations are avoided, by designedly arranging the units so as to completely avoid any elastic equivalence, for all speeds and under all conditions.

The relation between the number of vibrations per minute and the dimensions of the system is usually expressed by the formula $$N = \frac{30}{\pi}\sqrt{\frac{\mu J g}{LI}};$$

where $\mu$=the modulus of rigidity of the shaft material, $J$=the moment of inertia of the cross-section of the shaft, $g$ is a constant equal to the acceleration of gravity, $L$=the total length of the elastic shaft, and $I$=the moment of inertia of the rotor, the units being those of the pound, foot and second.

It will therefore be apparent that the speed of free torsional vibration of any of the pinion driving elements may be raised in four ways, viz:

1. By increasing the diameter of its elastic shaft.
2. By decreasing the length of the shaft.
3. By decreasing the moment of inertia of the rotor.
4. By increasing the modulus of rigidity of the shaft material.

It can, of course, be made slower by the reverse of these.

Changing the diameter, the length, or the modulus of rigidity of the shaft material will change the torsional elasticity of the shaft and thus change the natural period of torsional vibration of the driving unit. As above pointed out, instead of changing the natural period of torsional vibration by changing the tortional elasticity of the shaft, it may be done by changing the effective movement of inertia of the driving unit, such for example as by changing the moment of inertia of a turbine rotor, or by employing a flywheel or otherwise changing the moment of inertia.

Change in the diameter of the elastic shaft will usually be the most practically available in changing the speed of vibration, as the number of vibrations per minute increases as the square of the diameter. As they are inversely proportional to the square root of the product of the shaft length and moment of inertia of the turbine rotor, a considerable change in these produces a relatively small effect. For instance, an increase of 10% in the diameter of the elastic shaft would increase the vibrations per minute 21% (since $1.1^2$ equals 1.21). To produce the same effect the length of the elastic shaft, or the moment of inertia of the turbine rotor, or their product, would have to be reduced in the ratio 1.4641 to 1 (since $\sqrt{1.4641}$ equals 1.21.) Usually, however, it will not be as practical from an engineering standpoint to change the length of the elastic shaft or the moment of inertia of the turbine rotor as it is to change the diameter of the shaft.

The slight difference which would naturally occur in parts made commercially from the same design would not avoid the difficulties above set out. Investigation has shown that an increase of 10% in the diameter of the elastic shafts of one of the H. P. units, and the same change in an L. P. unit, of a four pinion gear, assuming an amplitude of 1/20,000 radian for the first-period tooth error, changed the maximum vibration stress at synchronizing speed from far above an allowable value to one practically negligible. A much smaller change than this is not recommended, but a change of 6% or 8% in the speed of vibration would have a sensible though, I believe, far too small an effect in reducing stresses. In separating the synchronizing speeds or natural periods of vibration of twin units from one another care must be taken that they are also well separated from those of the other units; and it is best that no synchronizing period should occur at or very near, above or below, full speed of the gear.

The second—or any other—period error of the teeth might have been used as an illustration instead of the first period, but as the second-period error goes through half a cycle in a quadrant of G, the combination of two pinions spaced 90° apart, when considering the second period, is equivalent to that of two pinions spaced 180° apart when considering the first period, and so on with the other periods. For instance, the combination of $P_1$, $P_2$, and a second period error, is equivalent to a single pinion gear, since the pinions are 180 degrees apart and 180°× 2 equal 360°.

In a two pinion gear, the two parts being elastically equivalent, there is one dangerous speed for the first-period error, one for the second-period, one of the third-period, and so on, one or the other of which would be sure to be approximated to frequently in a variable speed installation, such as a marine application. In a three or four pinion arrangement with one or two elastically equivalent pairs, there would be usually two dangerous speeds—the synchronizing speeds for, say, the high-pressure and the low-pressure units in a turbine drive—for each period of error. Thus there is a complete nest of dangerous speeds, the dangerous speeds increasing in number with each added pinion.

Further, if each motor driving a pinion consists of two parts in tandem connected by an elastic shaft, as has sometimes been made, there will be two synchronous periods for each pinion, which will double the complication.

For each of these cases, the substantial separating of the synchronous speeds of all the units, as above explained, is an effective remedy.

I have dealt almost entirely with the third source of excitation of vibration, viz., the variable pitch of the teeth. But the substantial separating of the synchronizing speeds of the various units can scarcely fail to produce smoother running, when the whole mechanism is submitted to the first and second sources, (viz., a variable torque from the motor or motors, and variable resistance from the propeller or other driven apparatus,) than if two or more units were in elastic sympathy.

In a system or device such as we have heretofore described, generally speaking the states of severe vibration occur at speeds of the main gear, when the cycle of any one of the simple harmonic elements of the errors of the teeth occurs synchronously with the natural period of vibration of two or more of the units of the system.

In the illustrated embodiment of the invention the two driving units are given unequal natural periods of torsional vibration by employing shafts $E_1$ and $E_2$ of different diameters. As above explained, this is the most effective and practical way from an engineering standpoint. However, as above pointed out, unequal periods of torsional vibration might be obtained by making the shafts of different lengths, or by making the shafts of materials having different moduli of rigidity or by making the units and particularly the rotors of different moments of inertia.

In the illustrated embodiment of the invention the large gear G, illustrated as driving a ship propeller, is shown as being driven by two pinions, each driven by a similar power unit, such as either two high pressure turbines or two low pressure turbines. It is to be understood, however, that various other arrangements might be used, such, for example, as a gear driven by four pinions, two of them driven by high pressure turbines and two by lower pressure turbines, in which case the driving units comprising the high pressure turbines would be given unequal natural periods of vibration and the same would be done with the other similar power units, viz: the two low pressure turbines. Moreover, while for the sake of illustration, I have shown the pinions as being spaced apart 180° around the gear G, they might be otherwise peripherally spaced.

In the claims, I have used the expression "similar units" to indicate those units having similar characteristics such as two or more high pressure turbines, or two or more low pressure turbines, but a high pressure turbine is not considered similar to a low pressure turbine. In each instance where there are similar units arranged according to my invention, they may be identical in every respect except as to their natural period of vibration. According to my invention, the units must not have too approximate elastic equivalence and such elastic equivalence is avoided if the natural period of vibration of each of the units is different from that of all the others. The expression "driving unit" is intended to include not only a "power unit" or "turbine", but also the shaft and pinion by which it is connected with the driven gear. In the case of a turbine drive, "similar driving units" are those which comprise similar turbines. My power transmission gearing may have all of the driving units "similar" as in the case of a transmission gearing driven by high pressure turbines only, or my power transmission gearing may have some only of the driving units "similar", as in the case of a transmission gearing driven by twin high pressure turbines and twin low pressure turbines, or by one high pressure turbine and two low pressure turbines, and I therefore do not intend to limit my claims to cases in which all of the driving units are similar or of the same class or type, but to include cases in which some but not necessarily all of the driving units are similar.

The principles of my invention as set forth above are applicable to many different mechanical embodiments and the specific arrangements shown in the drawings and explained above are to be considered merely as illustrative of the principles involved in my invention and I am not to be limited in any sense to the particular arrangement shown and described.

I claim:

1. A power transmission device, comprising a driven gear, and a plurality of similar driving units comprising turbines having rotors possessing substantially equal moments of inertia, shafts driven by the turbines and pinions driven by the shafts and meshing with the gear, the shafts of the similar driving units having substantially different torsional elasticities, whereby synchronous torsional vibration of the similar driving units is minimized or avoided, substantially as described.

2. A power transmission device, comprising a driven gear, and a plurality of similar driving units comprising similar turbines, shafts driven by the turbines and pinions driven by the shafts and meshing with the gear, said similar driving units having substantially different natural periods of torsional vibration, substantially as described.

3. In a power transmission device, the combination with a gear, of driving units comprising power units having rotors possessing substantially equal moments of inertia, shafts driven thereby and pinions driven by the shafts and meshing with the gear, said shafts being of different diameter whereby the driving units are given different natural periods of torsional vibration, substantially as described.

4. In a power transmission device, the combination of a gear, of driving units comprising turbines having rotors possessing substantially equal moments of inertia, shafts driven by the rotors and pinions driven by the shafts and meshing with the gear, said shafts having different diameters, whereby the driving units are given different natural periods of torsional vibration, substantially as described.

In testimony whereof, I have hereunto set my hand.

JOHN H. MACALPINE.